United States Patent [19]
Gross et al.

[11] 4,415,524
[45] Nov. 15, 1983

[54] APPARATUS FOR AND METHOD OF MONITORING FOR BREACHED FUEL ELEMENTS

[75] Inventors: Kenny C. Gross, Lemont; Robert V. Strain, Woodbridge, both of Ill.

[73] Assignee: The United States of America as represented by the U.S. Department of Energy, Washington, D.C.

[21] Appl. No.: 258,351

[22] Filed: Apr. 28, 1981

[51] Int. Cl.$^3$ ............................................... G21C 7/36
[52] U.S. Cl. .................................. 376/216; 376/245; 376/246; 376/253; 376/450
[58] Field of Search ............... 376/216, 245, 246, 253, 376/450

[56] References Cited

U.S. PATENT DOCUMENTS 3,786,257  1/1974  Weiss .................................. 376/253

OTHER PUBLICATIONS

Gross et al.; "Development of a Methodology For Analysis of Delayed-Neutron Signals" ANL-79-57.

*Primary Examiner*—Donald P. Walsh
*Attorney, Agent, or Firm*—Charles F. Lind; Hugh W. Glenn; Richard G. Besha

[57] ABSTRACT

This invention teaches improved apparatus for the method of detecting a breach in cladded fuel used in a nuclear reactor. The detector apparatus uses a separate bypass loop for conveying part of the reactor coolant away from the core, and at least three separate delayed-neutron detectors mounted proximate this detector loop. The detectors are spaced apart so that the coolant flow time from the core to each detector is different, and these differences are known. The delayed-neutron activity at the detectors is a function of the dealy time after the reaction in the fuel until the coolant carrying the delayed-neutron emitter passes the respective detector. This time delay is broken down into separate components including an isotopic holdup time required for the emitter to move through the fuel from the reaction to the coolant at the breach, and two transit times required for the emitter now in the coolant to flow from the breach to the detector loop and then via the loop to the detector. At least two of these time components are determined during calibrated operation of the reactor. Thereafter during normal reactor operation, repeated comparisons are made by the method of regression approximation of the third time component for the best-fit line correlating measured delayed-neutron activity against activity that is approximated according to specific equations. The equations use these time-delay components and known parameter values of the fuel and of the part and emitting daughter isotopes.

8 Claims, 9 Drawing Figures

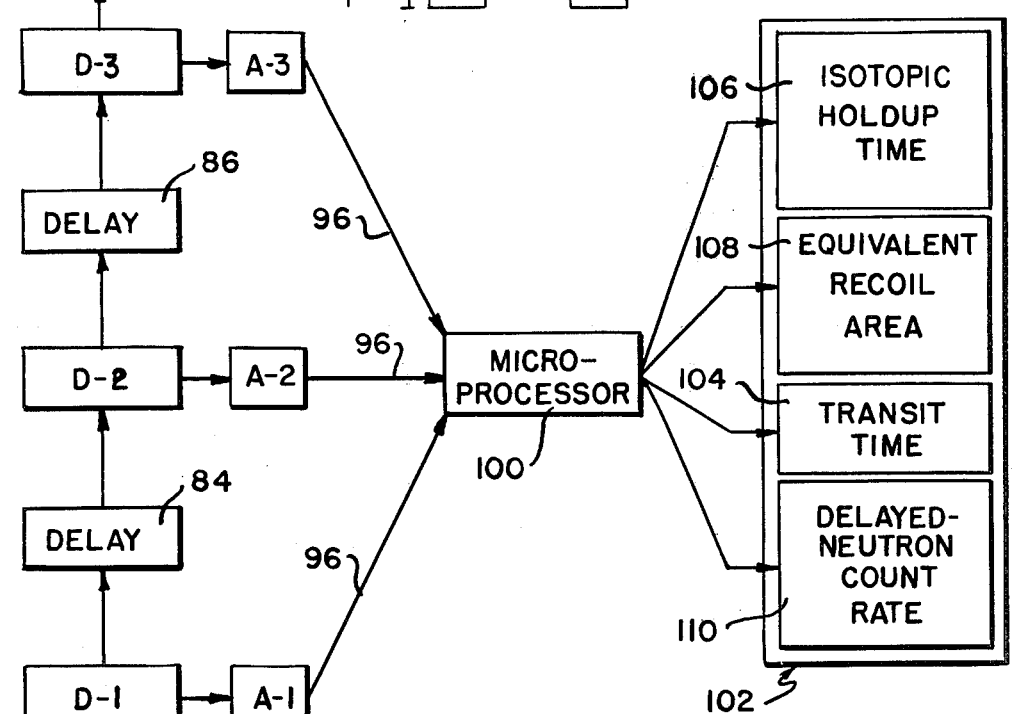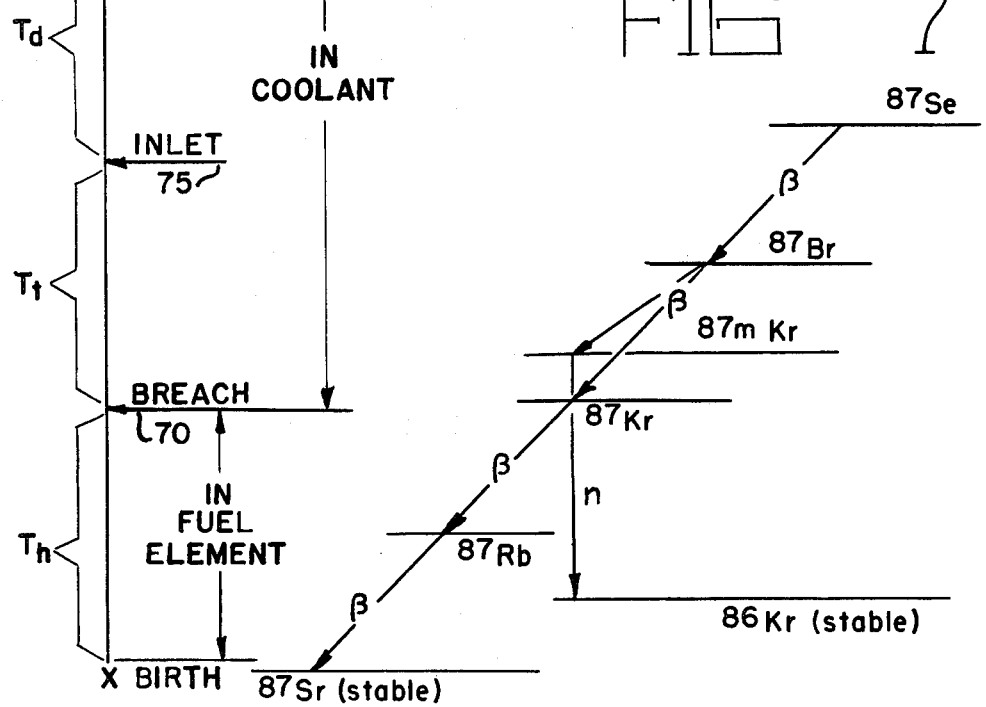

APPARATUS FOR AND METHOD OF MONITORING FOR BREACHED FUEL ELEMENTS

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

In nuclear reaction, particularly as regards the fission (or splitting) process, a neutron bombards a nucleus of a heavy material and produces two or more fission fragments and additional free neutrons. The reactor-fuel material is typically an isotope of uranium, such as uranium 235. The reaction continues when a released free neutron in turn strikes additional quantities of the fissile material; and in this regard a chain reaction is started and sustained. The reactor fuel can take the form of a fluid, such as an aqueous solution of enriched uranium; but in the main, the fuel is solid, either metallic uranium or a ceramic such as uranium oxide. The solid fuel material is fabricated into various small plates, pellets, pins, etc. which are usually clustered together in an assemblage called a fuel element. Almost all solid fuel elements are cladded with a protective coating or sheath that prevents direct contact between the fuel material and the reactor coolant. The cladding also serves as part of the structure of the fuel element. A zirconium alloy is commonly used as the cladding material in power reactors; whereas aluminum might more typically be used in research reactors.

The reaction of the fuel elements generates heat, and this is dissipated typically by means of a coolant passed through the reactor. In many instances, specific coolant paths are defined, such as through specific passages within which the fuel elements are housed, and the coolant is forced by appropriate pump means over these fuel elements. The coolaant can be water operating as either liquid or steam at pressures upward of 2000 psi, or the coolant can be a liquid metal such as sodium or a sodium-potassium mixture. The coolant systems further can vary, where only a single primary coolant like water is used and this is directed via a closed primary loop through a power-generating turbine or the like; or the primary coolant may be directed via a closed loop to a heat exchanger, and a second coolant is used in a second closed loop including this heat exchanger and the power-generating equipment. The particular system for generating and utilizing the heat is of no concern to this invention, but this background has been given merely for a more basic understanding of the operation of the system.

The primary coolant, as noted, passes in proximate contact over the cladded-fuel elements; and sound cladding isolates or separates the coolant from the radioactive material. However, in the event of any breach in the cladding, the coolant directly contacts the fuel. The radioactive discharge can then in turn be conveyed via the coolant throughout the entire coolant system to contaminate the system.

As noted, the reaction releases radioactive elements having varying half-life decay rates. These radioactive elements may include, for example, krypton, xenon, zirconium and barium, each of which has a specific radioactivity and a specific half-life. Should the radioactive elements admix with the coolant, the increase in the specific radiation level of the coolant can be detected by means of a GELI detector (a germanium and lithium gamma-ray detector) and/or by means of a gas analysis device.

Also given off as part of a radioactive discharge when the reaction occurs are at least nine different isotopes that not only give off the typical gamma rays of radioactivity, but also give off what is known as delayed neutrons. These isotopes, or delayed-neutron emitters, would include bromine, iodine, and tellurium to name just a few. Each of these delayed-neutron emitters is soluble in liquid sodium (the coolant) so that it readily blends in with the coolant, should a fuel element cladding breach occur, and flows with the coolant throughout the system. This also allows detection means for the delayed neutrons to be set up adjacent the coolant system at a location remote from the reactor core.

Each delayed-neutron emitter has a determinable and specific half-life decay rate. This will vary from a half-life as short as two seconds up to a half-life as much as 54 seconds. The half-life begins its countdown at the birth of the delayed-neutron emitter which is simultaneously with the nuclear reaction or the splitting of the particular atom in question.

This introduces also the concept of the parent-daughter, and the occurrence of a precursor and the release of the delayed neutron. In this regard, the reactions are sequential in nature and provide that a precursor occurs originally and decays to a new isotope, now called the daughter. The time sequence of this is all determined by specific known natural laws of decay.

The delayed-neutron detector is a gas-filled instrument, typically a boron fluoride ($BF_3$) or a helium isotope ($He^3$). The release of delayed neutrons from delayed-neutron emitters in the coolant passing near the detector ionizes the gas within the detector and results in a pulse count that increases with increased numbers of delayed-neutron emitters near the detector. The number of pulses per unit time determines the magnitude of the delayed-neutron signal.

The magnitude of the delayed-neutron signal is not only a function of what materials are involved, but also is a function of the size of the breach. In other words, a small breach or opening in the cladding would release a small amount of delayed-neutron emitters as compared to a larger breach at the same location. Also, the temperature of the fuel elements influences the rate of release of the delayed-neutron emitters where a hot element forces a greater rate of release than does a cooler element.

The physical location in the fuel element itself of the birthplace of the delayed-neutron emitter, and the holdup time required for the delayed-neutron emitter to even reach the breach in the cladding vary and have to be considered. The proximity of the breach to the detector can create additional uncertainty as to the detected count, because the travel time required for the infiltrated coolant to move to the detector can be short in one circumstance and can be quite long in another circumstance. The half-life decay would, of course, decrease the total count when a longer holdup time and/or travel time is involved. Also, the transit time can increase or decrease because the coolant flow may not be uniform or may vary as between one flow passage and another.

In this regard, the typical reactor has several fuel element passages each having its proportioned amount of coolant, where all coolant flow is combined at common inlet and/or discharge manifolds. The delayed-neutron detector can commonly be located in a coolant loop downstream of the reactor. The count of released delayed neutrons, however, could heretofore only be used in a very broad sense to determine when a breach in the cladding has occured, but the same could not accurately determine the severity or specific location of the breach.

SUMMARY OF THE INVENTION

This invention teaches improved techniques for detecting delayed neutrons released in a nuclear reactor and conveyed by the reactor coolant upon the coolant contacting the fuel via a breach in the fuel cladding, and for using this information in determining more accurately and meaningfully the physical nature of the breach.

The invention utilizes the concept that after an emitter of a delayed neutron is born in a fission reaction, there is a time delay in originally passing through the fuel element itself to a breach in the cladding and then passing via the coolant to the detector, and this delay can be broken down into several time segments. Equations have been derived utilizing this concept to approximate the delayed-neutron count as functions of these delay segments. The reactor is further calibrated according to the equations by taking counts of released delayed neutrons with several detectors spaced along the coolant flow path so as to provide a correlation to these time delays. The counts of the released delayed neutrons taken with the detectors during normal reactor operation are then compared against the counts approximated by the equations according to a systematic regression technique. This produces outputs of variable parameters having meaningful, almost physical, characteristics of the breach.

The invention specifically provides for the use of three or more detectors spaced apart along a common coolant flow path, and the regression comparison of detected counts against counts approximated according to specific equations so as to optimize on unique values of (1) isotopic holdup time ($T_h$), or internal transit time of the delayed-neutron emitter while yet located internally of the fuel element;

(2) the transit time ($T_t$) of the emitter moving from the breach via the coolant to a specific location relative to the detectors; and (3) an equivalent recoil area ERA, which provides a measure of the comparative size of the breach in the cladding.

BRIEF DESCRIPTION OF THE DRAWINGS

FIG. 6 is a schematic diagram illustrating the coolant flow and the relation of the birth in the fuel element of the delayed-neutron emitter and its timed release to the coolant, and showing also the detectors used herein and the processing chain of their output signals through a microprocessor to visual display indicators that readout corresponding breach parameters;

FIG. 7 is a schematic illustration again indicating the decay chain of fission-product material and its various isotopes thereby which form a theoretical basis for the operation of the subject invention;

DETAILED DESCRIPTION OF THE INVENTION

Figure 1:
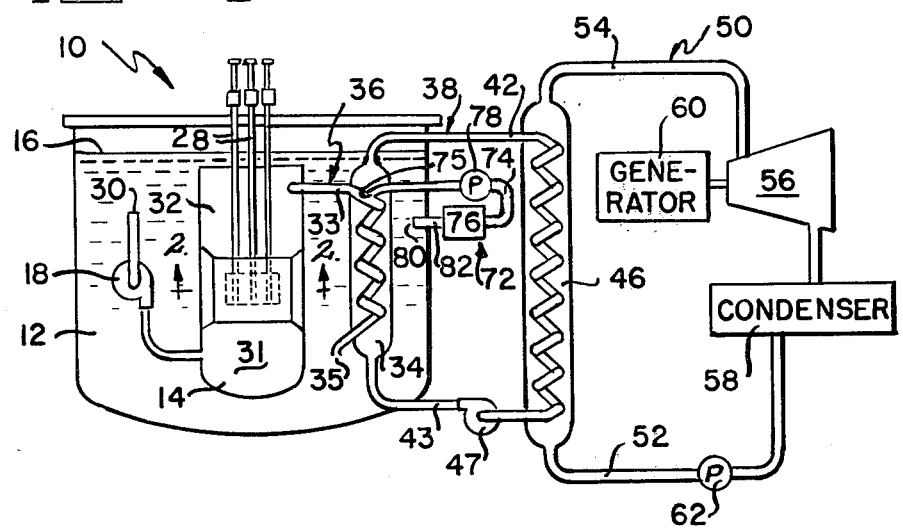
FIG. 1 is a schematic illustration of a nuclear-power generating system for which the subject application has utility, and showing therein a preferred embodiment of this invention.
Figure 2:
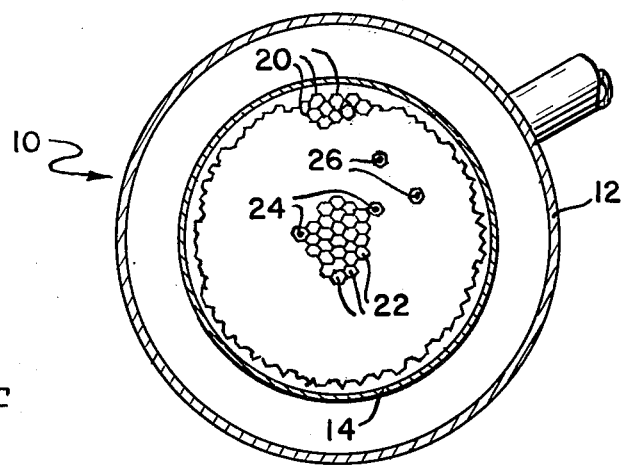
FIG. 2 is a sectional view, as seen generally from line 2—2 in FIG. 1, illustrating a typical reactor core having parallel passages therein within which the fuel elements are located and through which the coolant flows over the fuel elements.

In FIG. 1, a nuclear-power system is illustrated in schematic, including reactor 10 having a vessel 12 within which core 14 (FIG. 2) is located. The entire vessel 12 as illustrated confines a pool of coolant 16, which typically is liquid sodium, and the coolant 16 is circulated throughout various flow circuits (to be described) by means of a pump 18. The reactor core 14 has a plurality of honeycomb-type wall structures 20 (see FIG. 2) which define thereby a plurality of axially disposed parallel open-ended passages 22. Fuel-element assemblies 24 are located in certain of the respective passages 22 and moderators 26 are located in other of the various passages 22. The disposition of the fuel elements 24 and moderators 26 form no basis of this invention, but is made according to well-known techniques to achieve specific reactor outputs. Control rods 28 (FIG. 1) also fit within the reactor vessel 12, and can be raised and lowered by appropriate mechanism (not shown) to provide greater or lesser exposure to the fuel elements 22. The control rods 28 contain a neutron-absorbing material, such as boron and cadmium, and thereby control the continuous chain of reactions in the reactor, with greater or lesser degrees of exposure to the fuel elements, by absorbing greater or lesser numbers of the neutrons released in the reaction.

The coolant 16 is circulated by the pump 18 initially from the top of the vessel at inlet 30 (FIG. 1) to a common inlet manifold 31, through the various passages 22 to a common outlet manifold 32, and via line 33 through a primary heat exchanger 34 for discharge back to the vessel at the bottom outlet 35. The specific reactor illustrated is a pool type reactor where the entire vessel is filled with the coolant, and further the primary heat exchanger 34 is located within the vessel. The flow line 33 to the heat exchanger 34 from the reactor outlet manifold 32 thereby is totally enclosed within the vessel to greatly minimize potential hazard should the line fail, since the leaking sodium would merely return to the pool where it would normally go anyway at the outlet 35. This primary coolant loop 36 thus includes the reactor 10, primary heat exchanger 34, and the coolant 16 in the vessel.

A secondary coolant loop 38 is also used, comprising the primary heat exchanger 34, lines 42 and 43, a secondary heat exchanger 46, and a pump 47. The pump 47 would circulate a coolant (not numbered, typically again of sodium but isolated from the primary loop coolant) through the heat exchangers 34 and 46, to transmit the heat from the primary coolant 16 to the secondary heat exchanger 46.

A conventional power generating closed-loop circuit 50 (having a coolant like water but isolated from the coolant of the secondary loop 38) would include the heat exchanger 46, water inlet line 52, steam outlet line 54, steam turbine 56, water condenser 58 and pump 62. The turbine 56 mechanically drives a generator 60 to produce electric power as is well known.

Figure 5:
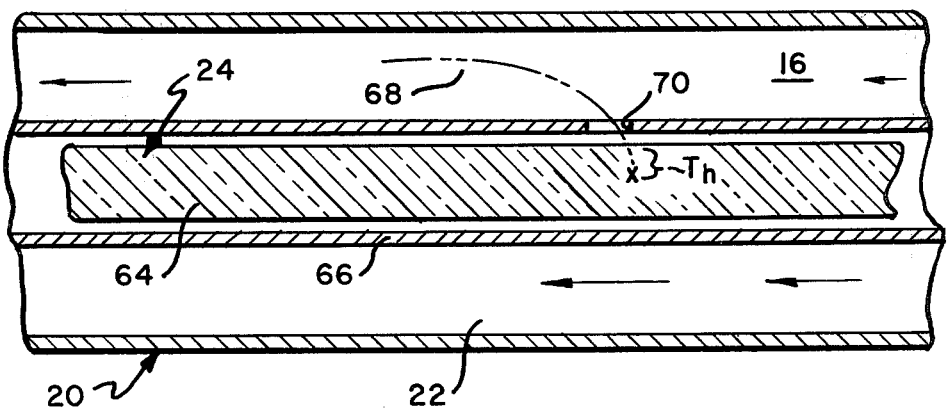
FIG. 5 is a schematic representation, in cross section, illustrating a fuel element within a coolant flow passage, and locating the birth of a delayed-neutron emitter therein and illustrating the holdup time $T_h$ from this to the cladding breach as well as the initial phases of the transit time $T_t$ from this breach to the detector.

A schematic cross section in FIG. 5 illustrates a typical fuel element 24 having a mass 64 of heavy element fuel, such as uranium 235, and a cladding 66 of appropriate material such as stainless steel, zirconium or aluminum, is formed over the fuel 64. Under normal circumstances, the continuous integrity of the cladding 66 isolates the fuel 64 from the coolant 16 flowing within the confines of the passage 22 in proximity over the fuel element 24. The reaction takes place inside the fuel 64 itself, as illustrated generally by the "X", and the various parent and daughter isotopes are thereafter emitted and travel the dotted path identified as 68. A breach in the cladding 66, illustrated by an opening 70, thus allows released isotopes to enter into the coolant flow loop 36. This can be a safety concern and in this regard, various forms of detection means, even to the point of duplication for increased reliability, are commonly provided in reactors to warn of "leakers", viz defectively cladded fuel.

Conventional detection means are of a fission-gas monitor that senses increased cover gas activity of released fission gases. This would include the activity of the cesium and rubidium daughters of the xenon and krypton isotopes. A GELI detector (using germanium-lithium crystals) measures the increased radioactivity levels of the cover-gas samples. In most breaches, the released fission gases are sufficiently abundant to be detected by means of these monitors.

However, test runs beyond breach of several experimental fuels including carbide or nitride compositions, and certain high-level fuel burnups have revealed the fact that significant delayed-neutron release might occur without significant levels of fission-gas release. Thus, using only cover-gas analysis can prove inadequate and insufficient for positive identification of a breach.

The disclosed technique for sensing and analyzing delayed-neutron discharge can therefore augment data obtained from cover-gas analysis or can be used independently in the detection and identification of breached fuel elements. One basic concept used in this invention is that certain precursors occur in the fuel and are released to the coolant through breaches in the fuel cladding. The delayed-neutron detectors should be located remote from the reactor core to avoid misreading because of possible stray neutrons from the reactor itself, but should be spaced no more than about thirty seconds from the reactor core as measured by the coolant flow.

Figure 3:
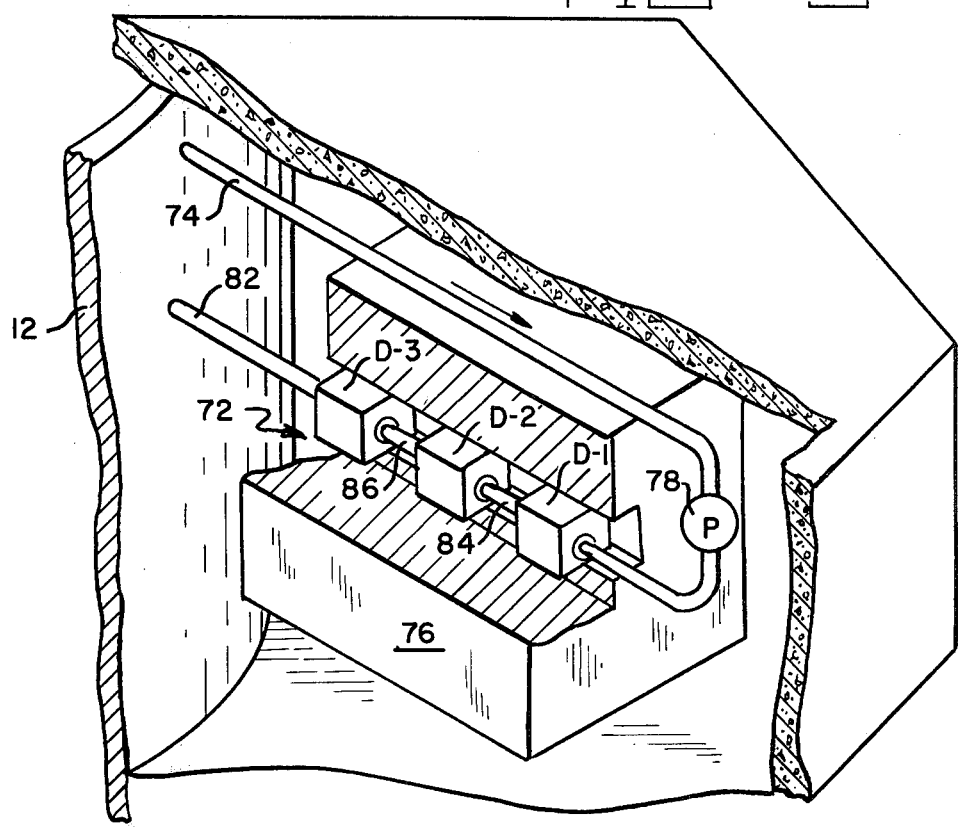
FIG. 3 is a perspective view of a schematic illustration of a coolant flow path of the reactor of FIG. 1, and illustrating the location and arrangement of the detector means taught herein.

The flow schematic of the detector loop 72 is illustrated in FIGS. 1 and 3, and includes a take-off line 74 at inlet 75 from the primary heat exchanger loop 36 downstream of the reactor 10, such as illustrated from the inlet line 33 to the heat exchanger 34. The delayed-neutron detector apparatus 76 is located in proximity to the line 74. The take-off line 74 bypasses a small amount of the circulating primary coolant 16, and a pump 78 in the line can be adjusted to vary and/or set the quantity bypassed. The coolant circulated past the detector apparatus 76 is discharged back into the reactor vessel 12 at outlet 80 via the line 82.

Figure 4:
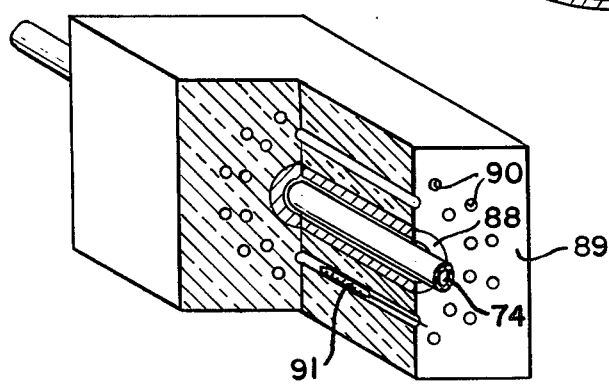
FIG. 4 is an enlarged broken away perspective view illustrating a preferred form of delayed-neutron detectors commonly used herein.

The detector apparatus 76, illustrated in greater detail in FIGS. 3 and 4, consists of at least three detectors D-1, D-2 and D-3 located in a series flow relationship in the detector loop coolant line 74, each further being separated from one another by a flow delay coil. Thus, coil 84 is located between detectors D-1 and D-2 and coil 86 is located between detectors D-2 and D-3. The detector D-1 is located in the coolant flow circuit from the core 14 a distance corresponding to the coolant transit time delay of the order of "T" between approximately fifteen and forty seconds, and preferably is more consistently in the range between twenty and thirty seconds. The time delay caused by coil 84 and 86 between the separate detectors D-1, D-2 and D-3, respectively, is each preferably 0.05 T or perhaps between one and three seconds.

A typical detector (D-1, D-2, or D-3) is illustrated in FIGS. 3 and 4, and includes lead shield 88 overlying the coolant flow tube 74, and a moderator block 89 formed over the shield. Individual cores or holes 90 extend parallel to the coolant tube 74 in the moderator block 89 so as to be capable of holding individual delayed-neutron detector probes 91 radially spaced from the tube 74. The detector probes 91 can be the Reuther Stokes boron fluoride ($BF_3$) type, and may be an inch in diameter and approximately 12 inches in length. Each probe 91 thereby generates a pulse count when a delayed neutron is discharged from an emitter while the emitter in the coolant is proximate the probe. Each separate detector probe 91 has output conductor means (FIG. 6), which is connected to appropriate signal amplification apparatus A-1, A-2 and A-3, respectively (that typically would include a preamplifier, amplifier and discriminator) which accepts the burst of current generated in each detector probe and produces an output pulse of voltage that is proportional to the intensity of the delayed-neutron activity sensed. The signal amplification apparatus (A-1, A-2 or A-3) further would typically include a mixer to combine the counts from the separate probes to produce a single averaged count for each detector. This output most typically is in the form of a DC signal.

The output counts from the detectors and amplification apparatus are then directed by conductor means 96 to a microprocessor 100 that is programmed according to specific equations (to be discussed in detail hereinafter) to produce meaningful outputs that can be read on indicators on instrument panel 102. Thus readout indicator 104 illustrates the transit time ($T_t$); indicator 106 illustrates the isotopic holdup time ($T_h$); indicator 108 illustrates the equivalent recoil area (ERA); and indicator 110 illustrates the total delayed-neutron count (A). The significance of each of these outputs and the manner of obtaining them will now be discussed in greater detail.

OPERATION OF THE INVENTION

The reaction in the core 14 produces countless individual fission reactions each in the nature of a chain, wherein referring specifically to FIG. 7, one fission chain of the isotope selenium 87 ($^{87}$Se) is illustrated by way of example. This isotope is just one of many that are formed as the first level of isotopes from reaction of uranium 235 ($^{235}$U) fuel. As illustrated, the isotope selenium 87 ($^{87}$Se) decays with beta radiation to the isotope bromine 87 (Br$^{87}$), which in turn decays with beta radiation to the unstable isotopes of krypton 87 m ($^{87m}$Kr) and krypton 87 ($^{87}$Kr). The latter isotope $^{87}$Kr in turn decays with beta radiation to the unstable isotope of rubidium 87 ($^{87}$Rb) which again decays with beta radiation to the stable isotope of strontium 87 ($^{87}$Sr). Likewise the unstable isotope of krypton 87 ($^{87}$Kr) decays with released delayed neutrons into the stable isotope of krypton 86 (Kr$^{86}$). This last reaction is of importance herein since it released the delayed neutrons that are to be detected. As mentioned, this evolution from parent to daughter, parent to daughter is just one of at least nine chains that is continuing and that produce delayed neutrons, and each follow specific half-life decay and radiation emission levels.

The nine parent isotopes of interest from which delayed neutrons are released somewhere down the decay chain specifically are: selenium 87 ($^{87}$Se); selenium 88 ($^{88}$Se); selenium 89 ($^{89}$Se); tellurium 137 ($^{137}$Te); tellurium 138 ($^{138}$Te); tellurium 139 ($^{139}$Te); krypton 93 ($^{93}$Kr); krypton 94 ($^{94}$Kr); and antimony 136 ($^{136}$Sb). The various parameters of these isotopes and of the daughter isotopes in the chain leading to the release of delayed neutrons, as will be needed in the practice of this invention, can be obtained from commercially available printings on the subject. The publications found most suitable by the inventors are: "Table of Isotopes" by C. Lederer and V. Shirley (1978), Wiley & Sons; "Compilation of Fission Products Yields", NEDO-12154-1, Vallecitos Nuclear Center (1974) by M. E. Meek and B. F. Rider; and "Reevaluation of Emission Probabilities of Delayed Neutrons from Fission Products", by T. Izak-Brian and S. Amiel, Nucl. Sci. Engineer 57, pp. 117-121 (1976).

During a normal reaction, the cladding 66 around the fuel 64 would preclude emitters of the delayed neutrons from entering the coolant flow stream and being circulated throughout the coolant loop 36. However, upon a breach (as at 70) occurring in the cladding 66, the emitters from the reaction in the fuel element will be initially exposed to the coolant and then will be carried by the coolant throughout the primary coolant loop 36 including specifically the detector loop 72 and past the detector apparatus 76.

The delayed-neutron count is dependent upon the area of fuel exposed in the reaction, the emission levels of the radiation, and the time delay beween when the reaction initially occurs and the neutron is detected. As symbolized in FIGS. 5 and 6, the reaction or precursor for the isotope chain is envisioned as taking place within the fuel 64 at the location indicated by "X". There is a time delay for the delayed-neutron emitter in traveling from the reaction spot "X" to the sodium coolant 16 via the breach 70. This is identified as $T_h$ of the dotted pattern 68 in FIG. 5 and schematically in FIG. 6. There is further a time delay for the emitter, now in the coolant 16, to travel from the location of the breach 70 to the inlet 75 of the detector loop 72. This time is identified as $T_t$, and likewise is illustrated schematically in FIG. 6. There is further a time delay for the emitter, now in detector loop 72, to move with the coolant from the inlet 75 to the detector apparatus 76; and this time is identified as $T_d$, and again is shown schematically in FIG. 6. The total time lapsed after the birth of the precursor or reaction in the fuel and until the delayed neutron is detected at the detector apparatus 76 is thus:

$$T_{TOTAL} = T_h + T_t + T_d;$$

where $T_h$ = Isotopic holdup time of delayed-neutron emitter in moving from reaction in the fuel to the coolant, in seconds;

$T_t$ = Transit time of the delayed-neutron emitter in the coolant in flowing from breach to the inlet of the detector loop, in seconds; and $T_d$ = Transit time of the delayed-neutron emitter in the coolant in flowing from the inlet of the detector loop to the detector, in seconds.

The transit time $T_d$ of the coolant in the detector loop will vary to each individual detector D-1, D-2, and D-3; and this time delay would be known.

The delayed-neutron activity for each isotope is a function of time, or $A_{dn}{}^i = f(T_h, T_t, T_d)^i$. Equation (1) approximates the delayed-neutron activity $A_{dn}{}^i$ for each isotope i at each detector D-1, D-2, and D-3, and is as follows:

$$A_{dn}^i = \frac{\lambda_D^i \cdot P_n^i}{F \cdot T_h} \left\{ \frac{\lambda_P^j \cdot S_P^j \{\exp[-\lambda_P^j(T_t + T_d)] + \exp[-\lambda_D^i(T_t + T_d)]\}}{(\lambda_D^i - \lambda_P^j)\left(\lambda_P^j - \frac{1}{T_h}\right)} + \frac{\left(\frac{\lambda_P^j}{\lambda_P^j + \frac{1}{T_h}} \cdot S_P^j + S_D^i\right) \cdot \exp[-\lambda_D^i(T_t + T_d)]}{\lambda_D^i + \frac{1}{T_h}} \right\} \quad (1)$$

where:

$A_{dn}{}^i$ = Total delayed neutron activity at each detector attributable to isotope i, in counts/second/cm$^3$ of coolant;

$\lambda_P^j$, $\lambda_D^i$ = Decay coefficient of parent and daughter isotopes of species i, in seconds $^{-1}$;

$S_P^j$, $S_D^i$ = Fission production rates of parent and daughter isotopes of species i, in fissions/second. This $S_D$, $S_P$ factor also is the equivalent of the fission rate $\alpha$, times the mass of fuel; however, the mass units of fuel in effect cancel out;

$P_n^i$ = Probability of emission of a delayed neutron for each daughter isotope, dimensionless; and F = Flow rate of primary coolant through the reactor core, in cm$^3$/second. Here again the flow rate values cancel out, so the absolute value of flow need not be known.

The total delayed-neutron count of each detector (D-1, D-2 or D-3) is the sum of the counts for all of the previously mentioned nine parent-daughter isotopes of interest (these account for approximately 99% of all delayed neutrons released). As such, Eq. (2) approximates the total delayed neutron counts for all isotopes as follows:

$$A_{dn}^{TOTAL} = \sum_{i=1}^{i=9} A_{dn}^i \quad (2)$$

where
$A_{dn}^{TOTAL}$ = Total count of delayed neutrons at any detector, in counts/cm³ of coolant.

Equation (3) approximates the equivalent recoil area ERA of the breached operational fuel, as compared to the recoil area $S_{rc}$ of the direct recoil calibration fuel, and is as follows:

$$ERA = C \times \frac{\alpha \times \rho \times W \times S_{rc} \text{ (For calibration fuel)}}{\alpha \times \rho \times W \text{ (For breached operation fuel)}} \quad (3)$$

where
ERA = Equivalent recoil area of breached operational fuel, in cm²;
C = Slope of best fit line for measured versus predicted delayed-neutron activity, dimensionless;
$\alpha$ = Fission rate of fuel, in fissions/gram/second;
$\rho$ = Density of fuel, in g/cm³;
W = Recoil distance in the fuel, in cm; and
$S_{rc}$ = Area of calibration fuel, in cm².

The units of ERA are in square centimeters, however only in the case of a recoil emitter does this represent an actual physical area. For nonrecoil sources, viz, sources with isotopic holdup time $T_h \neq 0$, ERA provides a measure of the square centimeters of source material that would produce the count response if direct recoil were the only mechanism for release.

The recoil distance W is very small, viz a micron or two, and represents the distance below the surface of the fuel where the reaction takes place. This value is available in the publications already cited for most fuel materials.

In these equations, the transit time $T_t$, and the isotopic holdup time $T_h$ are in various degrees either known or unknown, depending upon the circumstance as will be explained; and the slope C is unknown. The other parameters, namely the $\lambda_p$, $\lambda_D$ values for the decay coefficient, the fission production rates $\alpha$ and the densities $\rho$ of the fuel, the fission production rates $S_{P}^i$, $S_{D}^i$ for the parent and daughter isotopes, and the probability of neutron emission for the daughter isotopes $P_n^i$ are known from the nuclear data tables or approximated from calibration.

In order to utilize Eqs. (1), (2) and (3), the detector apparatus 76 is initially calibrated with respect to the reactor 10. In this regard, a specific quantity of fuel, such as a nickel-uranium source (UNi), is reacted in the core 14 with typical coolant flows through the primary coolant loop 36 and the detector loop 72. These flows are determined by the specific operation of pump 18 for the primary flow loop 36 and pump 78 for the detector flow loop 72. The recoil area ($S_{rc}$) of the fuel is known. This fuel (UNi) is preferred since it has only surface emission of the isotopes so that the isotopic holdup time $T_h$ would be equivalent to zero. From this known reactive radiation, for example, of perhaps $1.7 \times 10^{12}$ atoms/second, detected delayed-neutron counts (of perhaps 1000 for D-1, 850 for D-2, and 700 for D-3) might be measured. This would correlate the calibration fuel recoil area $S_{cr}$ and the emitter time parameters $T_t$ and $T_d$ for specific emitter activity and detector readouts.

Once the reactor 10 and detector apparatus 76 have been calibrated, standard reactor operation can be started, and when equilibrium is reached, the detector counts can be noted. The actual microprocessor 100 will allow instantaneous and simultaneous corrections according to the Eqs. (1), (2) and (3) as the operation progresses so that the readouts on the indicators 104, 106, 108 and 110 would always be current. However, the basic operation of the Eqs. (1), (2), and (3) and the systematic regression technique used to solve them will be explained according to a brief individual sequence of operation.

With the reactor 10 operating under steady state conditions and using the operational fuel, there would be readings obtained on the various readout indicators 104, 106, 108 and 110. With the fuel cladding intact, these readings would be constant and would be incidental to what is called "tramp" radiation. These tramp readings would be subtracted from subsequent indicator readings after a breach occurs.

The value of $T_d$ (the time for coolant flow in the detector loop) would be known for each detector D-1, D-2 and D-3, and different because of the delay coils 84 and 86. The values of $T_t$ and $T_h$ would be unknown, or at least not known specifically. According to the regression method, a value of $T_t$ (the transit time of the coolant from the breach to the inlet of the detector loop) would be assumed based on the values of $T_t$ obtained from the reactor calibration. A value of the isotopic holdup time $T_h$ would be guessed. The delayed-neutron activity with these three values for $T_d$, $T_t$ and $T_h$ would be calculated using Eq. (1). For this calculation, only the daughter isotope immediately above the release of the delayed neutron is considered, and its parameter values are used; and only the parent isotope immediately above this daughter isotope with its parameter values is used. However, if the half-life time of the daughter isotope in question is too short, viz almost instantaneous, for the parameter values in Eq. (1) its parent isotope is considered then as the daughter isotope, and a parent isotope of this parent (daughter) isotope is considered as the parent isotope. The estimated delayed-neutron counts of all isotopes would be summed up using Eq. (2).

Figure 8:
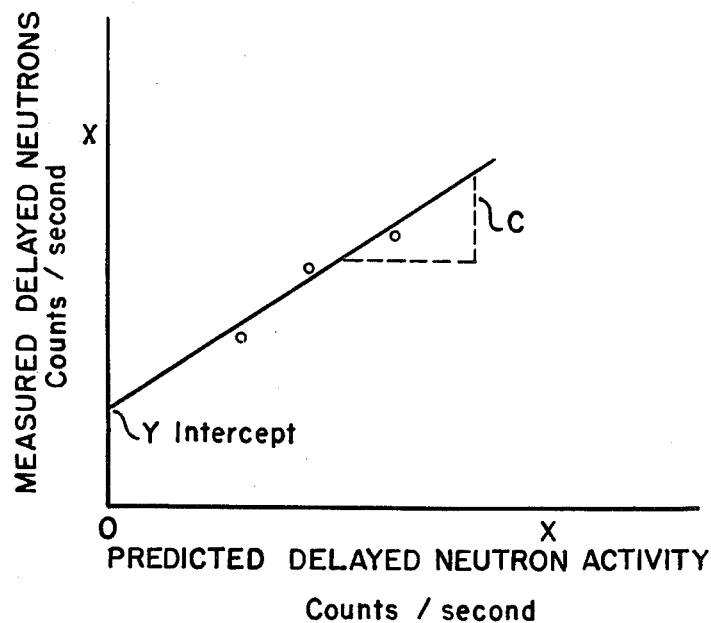
FIG. 8 is a graphic interpretation of a best fit line made with the measured versus predicted delayed-neutron counts.

A single count value for each of the detectors D-1, D-2 and D-3 would thus be estimated, and these outputs would be compared against the three separate readings on the actual detectors D-1, D-2 and D-3. Using the predicted delayed-neutron activity as the "X" coordinate and the measured delayed-neutron activity as the "Y" coordinate, the comparative outputs will yield three points on a graph (see FIG. 8). A straight line according to the best-fit technique can be passed through these points, and this line will have a slope C as well as a "Y" intercept. The "Y" intercept of the best-fit line represents the neutron activity due to gamma radiation normally present in the reactor core. The slope C is the relative severity of the breach as compared to non-breached fuel; or as noted from Eq. (3), the slope provides the ratio of the equivalent recoil area ERA compared to the calibration recoil area $S_{cr}$.

Figure 9:
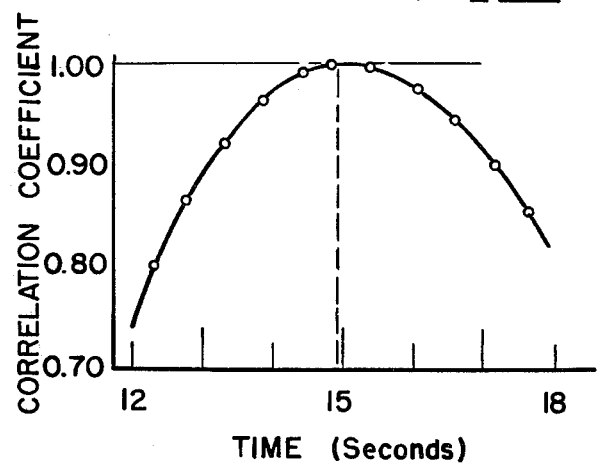
FIG. 9 is a graphic interpretation of the correlation coefficient versus time functions used with the regressive approximation method to find the most accurate time value.

Having thus obtained one best-fit line with one guess of the isotopic holdup time $T_h$, a single point on a correlation coefficient curve, as indicated in FIG. 9, can be made according to the linear regression method. The correlation coefficient R is a measure of how closely the best-fit line can be fitted on the previously mentioned comparative curve of FIG. 8, and can be determined mathematically according to Eq. (4):

$$R = \frac{\sum_n [X_n - Ave(X_n)] \cdot [Y_n - Ave(Y_n)]}{\sqrt{\left(\sum_n [X_n - Ave(X_n)]^2\right) \cdot \{[Y_n - Ave(Y_n)]^2\}}} \quad (4)$$

where
$X_n$, $Y_n$ are the coordinates corresponding to each point n.

A new guessed time for $T_h$ would now be used, and Eqs. (1) and (2) would be solved again, resulting in a second set of three comparative measured-versus-predicted counts of the delayed neutrons, a second best-fit line can be generated according to these inputs, and a similar correlation coefficient R for this new line can be generated. The technique would be repeated again for third, fourth, etc. guessed times $T_h$, the best-fit line through the comparative count made, and the corresponding correlation coefficient R of the best-fit line determined. The different correlation coefficients for different guessed times $T_h$ would generate a dome-shaped curve, as illustrated in FIG. 9. Where the curve has a zero slope, the closest best-fit is achieved, which gives also the best guessed isotopic holdup time $T_h$. Using this $T_h$ value, slope C can be accurately determined from Eq. (3) or from the traced curve of FIG. 8, and indicates the relative severity of breach or the equivalent recoil area ERA.

This comparative regression procedure thereby allows the isotope holdup time $T_h$ to be accurately determined. In test reactors where the fuel might be highly varied, this $T_h$ variable is typically most sensitive to variation. However, in commercial reactors where the fuel will be highly uniform, the isotopic holdup time $T_h$ will be generally constant. In this regard, $T_h$ can be obtained during calibration and used then as a constant, and transit time $T_t$ can be guessed in solving Eq. (1). When transit time $T_t$ is determined accurately, the location of the "leaker" in the reactor core 14 can be realistically approximated.

Thus, the comparative determination of measured-versus-calculated delayed-neutron activity can give the approximate location and severity of the breach, by proper evaluation of the transit time $T_t$ and the isotopic holdup time $T_h$. This comparison of the actual measured counts and the calculated counts is ongoing and continuous so that up-to-date information is constantly being monitored. The disclosed apparatus and procedure are well suited for use in either test or commercial power reactors for determining breaches in fuel cladding. Although the technique has been explained primarily with respect to a reactor having sodium as a coolant, it also can be used where water or some other coolant is used. In this regard, most of the isotopes of interest are also soluble in water, so that these emitters could travel to the detector apparatus that would be located remote from the core.

In the practice of this invention, the different isotopes contribute significantly different predicted counts for the number of delayed neutrons that should be measured at the detector apparatus. In fact, isotope tellurium 137 ($^{137}$Te) decays into iodine 137 ($^{137}$I), which for most reactor fuels and detector locations of interest will generate between 20 and 50% of all the delayed neutron counts. The next most significant parent isotopes of interest would be selenium 88 ($^{88}$Se) and selenium 89 ($^{89}$Se), decaying to isotopes bromine 88 ($^{88}$Br) and bromine 89 ($^{89}$Br). These three parent isotopes generate between 65 and 85% of the total predicted count.

In next decreasing order of interest, the parent isotopes would probably be tellurium 138 ($^{137}$Te); selenium 87 ($^{87}$Se); krypton 93 ($^{93}$Kr); antimony 136 ($^{136}$Sb); krypton 94 ($^{94}$Kr); and tellurium 139 ($^{139}$Te). As such, it is possible to predict the delayed-neutron activity for only certain of the isotope reactions, with preference being given to the isotopes as listed above, and yet achieve fairly reliable predictions.

A specific algorithm model suitable for using the disclosed invention on a liquid metal fast-breeder reactor is given in Argonne National Laboratory publication ANL-80-55, which was prepared under U.S. Department of Energy Contract W-31-109-ENG-39 and is available from the National Technical Information Services, U.S. Department of Commerce, 5285 Port Royal Road, Springfield, Va. 22165.

The embodiments of the invention in which an exclusive property or privilege is claimed are defined as follows:

1. In the operation of a nuclear power reactor having a core, cladded fuel in the core, a coolant flowing through the core over the cladded fuel, and heat exchanger means to cool the coolant and obtain useful energy thereby, an improved safety control to detect if any fuel cladding has a breach that allows delayed-neutron emitters to enter the coolant, the combination comprising means for conveying the coolant from the core through a loop flow circuit and back to the core, at least three separate delayed-neutron detectors and means for mounting each detector proximate the flow circuit operable to count the delayed neutrons released by emitters in the coolant when passing the detector, the first detector being located downstream from the core a distance corresponding to coolant flow time therebetween of between fifteen and forty seconds and the second and third detectors being spaced apart and downstream from the first and second detectors, respectively, each corresponding to coolant flow time therebetween of between 1 and 3 seconds, the delayed-neutron activity at the detectors being a function of the delay time after reaction in the fuel until the coolant carrying the delayed-neutron emitter passes the respective detector, where $T_{TOTAL} = T_h + T_t + T_d$, means for calibrating the detectors during calibration operation of the reactor to determine $T_d$ and at least one of $T_h$ and $T_t$ with respect to measured delayed-neutron counts on the detectors for the calibration fuel, and means for monitoring the detectors during reactor operation and for making repeated comparisons for the best fit line by the method of regression approximation of the delayed-neutron counts measured at the respective detectors and the delayed-neutron counts approximated for each detector according to the equations:

$$A_{dn}^i = \frac{\lambda_D^i \cdot P_n^i}{F \cdot T_h} \left[ \frac{\lambda_P^i \cdot S_P^i \{\exp[-\lambda_P^i(T_t+T_d)] + \exp[-\lambda_D^i(T_t+T_d)]\}}{(\lambda_D^i - \lambda_P^i)\left(\lambda_P^i - \frac{1}{T_h}\right)} + \right.$$

$$\left. \frac{\left(\frac{\lambda_P^i}{\lambda_P^i + \frac{1}{T_h}} \cdot S_P^i + S_D^i\right) \cdot \exp[-\lambda_D^i(T_t+T_d)]}{\lambda_D^i + \frac{1}{T_h}} \right] \quad (1)$$

and $$A_{dn}^{TOTAL} = \sum_{i=1}^{i=9} A_{dn}^i \quad (2)$$

where $A_{dn}^i$ = Total delayed neutron activity at each detector attributable to isotope i, in counts/second/cm³ of coolant;

$A_{dn}^{TOTAL}$ = Total count of delayed neutrons at any detector, in counts/cm³ of coolant;

$\lambda_P^i$, $\lambda_D^i$ = Decay coefficient of parent and daughter isotopes of species i, in seconds $^{-1}$;

$S_P^i$, $S_D^i$ = Fission production rates of parent and daughter isotopes of species i, in fissions/second;

$P_n^i$ = Probability of emission of a delayed neutron for each daughter isotope, dimensionless; and F = Flow rate of primary coolant through the reactor core, in cm³/second;

$T_h$ = Isotopic holdup time of delayed-neutron emitter in moving from reaction in the fuel to the coolant, in seconds;

$T_t$ = Transit time of the delayed-neutron emitter in the coolant in flowing from breach to the inlet of the detector loop flow circuit, in seconds; and $T_d$ = Transit time of the delayed-neutron emitter in the coolant in flowing from the inlet of the detector loop to the detector, in seconds.

2. The safety control combination according to claim 1, further including means for evaluating the severity of the cladding breach according to the equation:

$$ERA = C \times \frac{\alpha \times \rho \times W \times S_{rc} \text{ (For calibration fuel)}}{\alpha \times \rho \times W \text{ (For breached operation fuel)}}$$

where

ERA = Equivalent recoil area of breached operational fuel, in cm²;

C = Slope of best fit line for measured versus predicted delayed-neutron activity, dimensionless;

$\alpha$ = Fission rate of fuel, in fissions/gram/second;

$\rho$ = Density of fuel, in g/cm³;

W = Recoil distance in the fuel, in cm; and $S_{rc}$ = Area of calibration fuel, in cm².

3. The safety control combination according to claim 1, wherein the calculations are made according to Eqs. (1) and (2) for the parent isotope of tellurium 137 ($^{137}$Te), selenium 88 ($^{88}$Se), and selenium 89 ($^{89}$Se).

4. In the operation of a nuclear power reactor having a core, cladded fuel in the core, a coolant flowing through the core over the cladded fuel, and heat exchanger means to cool the coolant and obtain useful energy thereby, an improved method of detecting if any fuel cladding has a breach that allows delayed-neutron emitters to enter the coolant, comprising the steps of locating at least three separate delayed-neutron detectors proximate a coolant loop flow circuit downstream of the core, the first detector being located downstream from the core a distance to correspond to coolant flow time therebetween of between fifteen and forty seconds and the second and third detectors being spaced apart and downstream from the first and second detectors respectively, each corresponding to coolant flow time therebetween of between 1 and 3 seconds; calibrating the detectors with respect to calibration operation of the reactor to determine $T_d$ and at least one of $T_h$ and $T_t$ with respect to measured delayed-neutron counts on the detectors, and monitoring the detector counts and repeatedly comparing for best-fit line by the method of regression approximation of the delayed-neutron counts measured at the respective detectors and the delayed-neutron counts approximated for each detector according to the equations:

$$A_{dn}^i = \frac{\lambda_D^i \cdot P_n^i}{F \cdot T_h} \left[ \frac{\lambda_P^i \cdot S_P^i \{\exp[-\lambda_P^i(T_t+T_d)] + \exp[-\lambda_D^i(T_t+T_d)]\}}{(\lambda_D^i - \lambda_P^i)\left(\lambda_P^i - \frac{1}{T_h}\right)} + \right.$$

$$\left. \frac{\left(\frac{\lambda_P^i}{\lambda_P^i + \frac{1}{T_h}} \cdot S_P^i + S_D^i\right) \cdot \exp[-\lambda_D^i(T_t+T_d)]}{\lambda_D^i + \frac{1}{T_h}} \right] \quad (1)$$

and $$A_{dn}^{TOTAL} = \sum_{i=1}^{i=9} A_{dn}^i \quad (2)$$

where $A_{dn}^i$ = Total delayed neutron activity at each detector attributable to isotope i, in counts/second/cm³ of coolant;

$A_{dn}^{TOTAL}$ = Total count of delayed neutrons at any detector, in counts/cm³ of coolant;

$\lambda_P^i$, $\lambda_D^i$ = Decay coefficient of parent and daughter isotopes of species i, in seconds $^{-1}$;

$S_P^i$, $S_D^i$ = Fission production rates of parent and daugher isotopes of species i, in fissions/second;

$P_n^i$ = Probability of emission of a delayed neutron for each daughter isotope, dimensionless; and F = Flow rate of primary coolant through the reactor core, in cm³/second;

$T_h$ = Isotopic holdup time of delayed-neutron emitter in moving from reaction in the fuel to the coolant, in seconds;

$T_t$ = Transit time of the delayed-neutron emitter in the coolant in flowing from breach to the inlet of the detector loop flow circuit, in seconds; and $T_d$ = Transit time of the delayed-neutron emitter in the coolant in flowing from the inlet of the detector loop to the detector, in seconds.

5. The method of detecting breached fuel cladding according to claim 4, wherein the calculations are made according to Eqs. (1) and (2) for the parent isotopes of tellurium 137 ($^{137}$Te), selenium 88 ($^{88}$Se), and selenium 89 ($^{89}$Se).

6. The method of detecting breached fuel cladding according to claim 4, further including evaluating the severity of the cladding breach by using the equation:

$$ERA = C \times \frac{\alpha \times \rho \times W \times S_{rc} \text{ (For calibration fuel)}}{\alpha \times \rho \times W \text{ (For breached operation fuel)}}$$

where
- ERA = Equivalent recoil area of breached operational fuel, in cm$^2$;
- C = Slope of best-fit line for measured versus predicted delayed-neutron activity, dimensionless;
- $\alpha$ = Fission rate of fuel, in fissions/gram/second;
- $\rho$ = Density of fuel, in g/cm$^3$;
- W = Recoil distance in the fuel, in cm; and
- $S_{rc}$ = Area of calibration fuel, in cm$^2$.

7. The safety control combination according to claim 1, wherein the calculations are made according to Eqs. (1) and (2) for the parent isotope of tellurium 137 ($^{137}$Te), selenium 88 ($^{88}$Se), selenium 89 ($^{89}$Se), tellurium 138 ($^{138}$Te), selenium 87 ($^{87}$Se), krypton 93 ($^{93}$Kr), antimony 136 ($^{136}$Sb), krypton 94 ($^{94}$Kr), and tellurium 139 ($^{139}$Te).

8. The method of detecting breached fuel cladding according to claim 4, wherein the calculations are made according to Eqs. (1) and (2) for the parent isotopes of tellurium 137 ($^{137}$Te), selenium 88 ($^{88}$Se), selenium 89 ($^{89}$Se), tellurium 138 ($^{138}$Te), selenium 87 ($^{87}$Se), krypton 93 ($^{93}$Kr), antimony 136 ($^{136}$Sb), krypton 94 ($^{94}$Kr), and tellurium 139 ($^{139}$Te).

* * * * *